(12) United States Patent
Ryan et al.

(10) Patent No.: US 7,677,598 B1
(45) Date of Patent: Mar. 16, 2010

(54) INTEGRATED SIDE AIRBAG AND INFLATABLE BELT

(75) Inventors: Sean Timothy Ryan, Farmington Hills, MI (US); Eric D. Veggian, Superior Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/416,255

(22) Filed: Apr. 1, 2009

(51) Int. Cl.
*B60R 21/20* (2006.01)
(52) U.S. Cl. .................................... 280/730.2; 280/733
(58) Field of Classification Search ............... 280/730.2, 280/733
See application file for complete search history.

(56) References Cited

U.S. PATENT DOCUMENTS

| | | | |
|---|---|---|---|
| 3,888,503 A | 6/1975 | Hamilton | |
| 5,393,091 A | 2/1995 | Tanaka et al. | |
| 5,465,999 A | 11/1995 | Tanaka et al. | |
| 5,829,841 A | 11/1998 | Pywell et al. | |
| 6,113,135 A | 9/2000 | Tsutsumi | |
| 6,237,936 B1 | 5/2001 | Quade et al. | |
| 6,336,656 B1 * | 1/2002 | Romeo | 280/733 |
| 6,340,173 B1 * | 1/2002 | Specht | 280/733 |
| 6,378,898 B1 * | 4/2002 | Lewis et al. | 280/733 |
| 6,382,666 B1 * | 5/2002 | Devonport | 280/733 |
| 6,705,641 B2 | 3/2004 | Schneider et al. | |
| 7,350,803 B2 | 4/2008 | Abramczyk et al. | |
| 7,413,220 B2 | 8/2008 | Itoga et al. | |
| 7,455,314 B2 | 11/2008 | Ryan et al. | |
| 7,481,452 B2 * | 1/2009 | Itoga et al. | 280/733 |
| 2002/0041088 A1 * | 4/2002 | Grace et al. | 280/733 |
| 2002/0130498 A1 * | 9/2002 | Kurata et al. | 280/733 |
| 2002/0171233 A1 * | 11/2002 | Grace | 280/733 |
| 2005/0189752 A1 | 9/2005 | Itoga et al. | |
| 2005/0263990 A1 * | 12/2005 | Clute | 280/733 |
| 2006/0012155 A1 | 1/2006 | Shaner et al. | |
| 2006/0055158 A1 * | 3/2006 | Park | 280/733 |
| 2006/0119085 A1 * | 6/2006 | Masuda et al. | 280/733 |
| 2006/0208471 A1 | 9/2006 | Sundararajan et al. | |
| 2007/0096535 A1 | 5/2007 | Lundell et al. | |
| 2008/0018085 A1 | 1/2008 | Clute | |

FOREIGN PATENT DOCUMENTS

| | | |
|---|---|---|
| EP | 1 759 918 A1 | 3/2007 |
| EP | 1 990 243 | 11/2008 |
| JP | 2002145002 | 5/2002 |

* cited by examiner

*Primary Examiner*—Toan C To
(74) *Attorney, Agent, or Firm*—Frank A. MacKenzie; Brooks Kushman P.C.

(57) ABSTRACT

A vehicle seat and integrated side impact protection system includes a seat bottom, a seat back movably attached to the seat bottom, and a fold-flat mechanism within a lower portion of the seat back for permitting movement of the seat back between a seating configuration and a fold-flat configuration. An airbag module is located within an upper portion of the seat back adjacent the outboard side thereof and includes a side airbag and an inflator supplying inflation gasses. A lap belt extends between inboard and outboard sides of the seat and has an inflatable portion adjacent the outboard side of the seat. A gas conduit extends between the airbag module and the lap belt for conducting gasses released by the inflator to the inflatable portion of the lap belt. The gas conduit has a flexible portion permitting folding movement of the seat back.

18 Claims, 3 Drawing Sheets

INTEGRATED SIDE AIRBAG AND INFLATABLE BELT

BACKGROUND

1. Field

The present invention relates generally to occupant restraint systems for automotive vehicles and more particularly to an integrated side-impact airbag and inflatable seat belt system.

2. Background Art

Side airbag systems for automotive vehicles are well known. Current side airbag systems typically include an airbag module mounted to a seat back frame, usually adjacent the outboard side of the seat back. Such airbag modules include an airbag stored in a deflated condition and an inflator that provides gasses to inflate the airbag when triggered by an impact or roll-over sensor. When inflated, the side airbag expands to be positioned between the door, B-pillar, or vehicle side wall adjacent the seat and the seat occupant's thorax, arm, and/or shoulder regions. See, for example, U.S. Patent Application US 2006/0012155 A1, the disclosure of which is incorporated herein by reference.

In some side impact situations, a thorax airbag of the type of side airbag described above may not offer an optimum level of protection for the seat occupant's pelvic region. It is possible to utilize a side airbag that, in the inflated condition, extends further downward to provide protection of the pelvic region in addition to the thorax. Compared with a thorax-only airbag, such a pelvic-thorax airbag may need to be mounted lower on the side of the seat back frame in order for the bag to inflate quickly enough to deploy the pelvic portion of the airbag to the desired position in the extremely short time interval available in a crash situation. A possible issue with this lower mounting position is that may conflict with certain seat features, such as a fold-flat mechanism, that occupy the same location on the seat frame need for the side airbag.

Inflatable seatbelt systems can also contribute to occupant safety. A typical inflatable belt system includes belt webbing configured for use as a three-point harness and providing both a lap belt and a shoulder belt. The belt webbing envelopes or otherwise surrounds an elongated inflatable airbag and a fold or rip-seam in the webbing opens to permit the airbag to expand. The airbag may be located in the portion of the webbing that forms the lap belt, the shoulder belt, or both. See, for example, U.S. Patent Application US 2006/0208471A1, the disclosure of which is incorporated herein by reference.

U.S. Patent Application US 2008/0018085 A1 discloses a belt-integrated pelvis airbag wherein an inflatable belt section is configured as a side impact airbag such that at least a portion of the airbag inflates between the side of the vehicle and the seat occupant. The inflatable belt section is connected with a gas source that is mounted in a seat belt retractor frame so that the gas source may be used to activate a belt pretensioner system simultaneously with inflation of the belt.

SUMMARY

A disclosed embodiment of the invention provides a side impact protection system that is adapted for use with a seat having a folding mechanism located within the lower portion of the seat back that prevents locating a pelvis airbag within the seat back. The embodiment comprises a vehicle seat having an airbag module disposed within the seat back adjacent the outboard side thereof to provide a thorax airbag when inflated. It further comprises a lap belt having an inflatable portion disposed adjacent the outboard end of the belt to provide a pelvis airbag when inflated. An inflator located in the airbag module provides inflation gasses to both the side airbag and the lap belt inflatable portion. A gas conduit connects the airbag module with the lap belt and conducts gasses released by the inflator to the inflatable portion of the lap belt. The conduit has at least one flexible portion to allow the seat back to be moved relative to the seat bottom between a seating configuration and a fold-flat configuration.

The seat back-mounted side airbag module provides protection for the thorax region of a seat occupant while the inflatable portion of the lap belt provides protection for the occupant's pelvis region. Because the pelvis protection airbag is incorporated into the lap belt rather than being located inside of or adjacent to the lower seat back, the lower seat back remains free for a folding mechanism or other device mounted in the lower portion of seat back frame. Utilizing the gasses released by the inflator in the side airbag module to also inflate the lap belt inflatable portion simplifies the design and construction of the integrated side impact protection system.

In the disclosed embodiment, the airbag module comprises a side airbag, an inflator disposed inside the side airbag, and a fill tube having an inlet end in fluid communication with the inflator and an outlet end in fluid communication with the gas conduit. The fill tube further has at least one nozzle for discharging gasses released by the inflator into the side airbag. The size of the nozzle and the diameter of the tube can be tuned to adjust the relative amounts and/or rates of gasses flowing to the thorax airbag and inflatable seat belt.

In an embodiment of the invention, first and second connection fittings are located along the gas conduit to provide a means to easily assemble the components. First and second halves of an optically scannable code are imprinted on the two connection fittings so that the code may be read by an optical scanner only when the two fittings are properly connected with one another. This provides a method for monitoring and ensuring proper assembly.

BRIEF DESCRIPTION OF THE DRAWINGS

The features of the present invention are set forth with particularity in the appended claims. The present invention, both to its organization and manner of operation, together with further objectives and advantages thereof, may be best understood with reference to the following description, taken in connection with the accompanying drawings in which:

DETAILED DESCRIPTION OF EMBODIMENTS OF THE INVENTION

By way of example, a system and method for implementing the present invention is described below. The system and methodology may be adapted, modified or rearranged to best fit a particular implementation without departing from the scope of the present invention.

Figure 1:
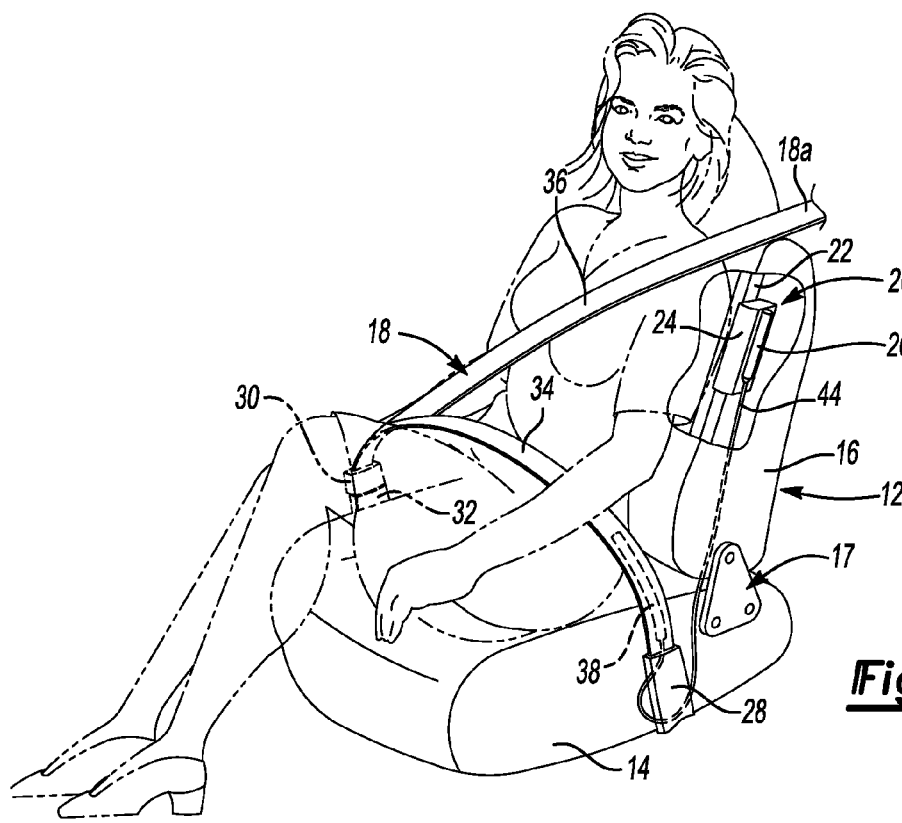
FIG. 1 illustrates a vehicle seat incorporating aspects of an embodiment of the present invention.
Figure 2A:
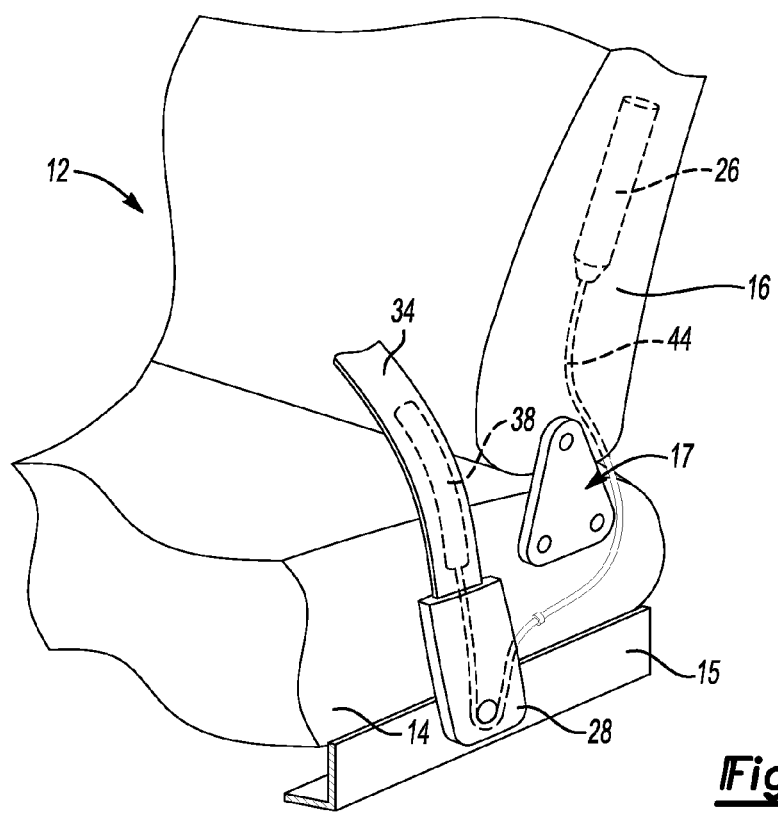
FIG. 2A is a detailed view of a portion of the vehicle seat of FIG. 1.
Figure 2B:
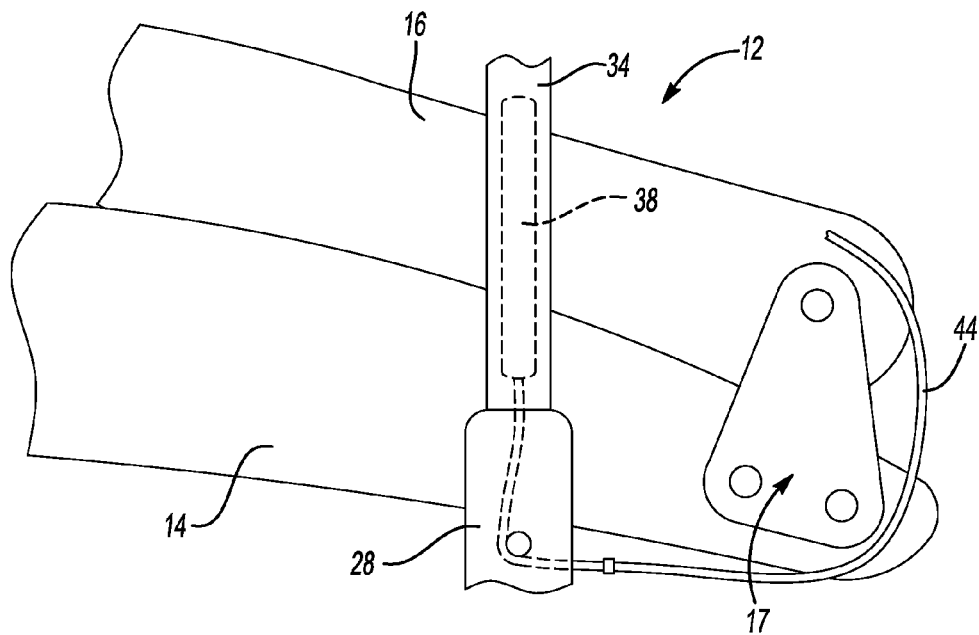
FIG. 2B is a detailed view of a portion of the vehicle seat of FIG. 1 with the seat back in a fold flat condition.

Referring to FIGS. 1, 2A, and 2B, a vehicle seat 12 is shown that incorporates an occupant protection system according to one embodiment of the invention. Seat 12 generally comprises a seat bottom 14 and a seat back 16. Seat 12 may be attached to a floor of the vehicle by means of floor rails 15 and may be movable forward and rearward along the rails as is well known in the automotive interiors art.

Seat back 16 is connected with seat bottom 14 by a folding mechanism (generally indicated at 17) for movement between an upright seating position shown in FIG. 1 an 2A and a fold-flat configuration shown in FIG. 2B. The folding movement of seat back 16 relative to seat bottom 14 may be accomplished by a powered system comprising one or more electric motors (not shown) and/or by a manually operated hinge and latch mechanism. The fold-flat configuration may be desirable for a number of reasons, for example to carry large objects in the passenger cabin or to provide easy access to an area behind seat 12.

Seat 12 is equipped with a side airbag module 20 located within an upper portion of seat back 16 adjacent an outboard side thereof. Airbag module 20 may be attached to a portion of seat frame 22 that forms the interior structure of seat back 16.

Airbag module 20 comprises an airbag 24, illustrated in a folded, deflated position, and an inflator 26. Inflator 26 may be a pyrotechnic device that uses combustion to generate gasses for inflation of the airbag, or it may be pressure vessel that stores inflation gasses in a compressed or liquefied form.

The terms "inboard" and "outboard," as used in this document, refer to the location of seat 12 and other components relative to a longitudinal (fore-and-aft) centerline of a vehicle. The inboard side of seat 12 is that which is closer to the longitudinal centerline of the vehicle, and the outboard side is that which is farthest from the centerline and is therefore closely adjacent to an exterior side wall or a side door (not shown) of a vehicle. Accordingly, the seat 12 depicted herein is intended to be located on the left side of a vehicle.

The shape of side airbag 24 and its location adjacent the upper portion of seat back 16 are such that the airbag, when inflated, serves to provide cushioning and restraint to the thorax region of the seat occupant. An occupant restraint belt 18 has a first end secured to a seatbelt anchor 28 located adjacent an outboard side of the seat 12. Seatbelt anchor 28 may be attached to floor rail 15 the floor structure of the vehicle (as shown), or to a vehicle side wall structure, or to a floor structure of the vehicle, or to a lower portion of the seat frame. In the illustrated embodiment of the invention, restraint belt 18 is a combined lap/shoulder belt, having an upper end 18a that may be secured to an upper anchor or retraction device (not shown) that may be located on or near a side wall or B-pillar of the vehicle. Alternatively, the upper anchor or retraction device may be located on the upper, outboard portion of seat back 16. As is well known in the occupant restraint art, a latch plate 30 is retained on restraint belt 18 for sliding adjustment along its length. Latch plate 30 is snapped into engagement with an inboard latch 32 to fasten the restraint belt 18 around the seat occupant. When restraint belt 18 is fastened around the seat occupant, latch plate 30 divides the belt into a lap belt portion 34 and a shoulder/chest portion 36.

Restraint belt 18 further comprises an inflatable belt airbag 38 integrated with lap belt 34 adjacent to seatbelt anchor 28. Belt airbag 38 may comprise an airbag surrounded by a sleeve of conventional belt webbing that is folded with overlapping portions sewn together to form a "rip seam" that will tear open when the airbag inflates and expands. The size, configuration, and the outboard location of belt airbag 38 are preferably such that the bag, when inflated, expands to serve as a pelvis airbag. That is, the airbag provides cushioning between the occupant's pelvis region and the side wall or door of the vehicle immediately outboard of seat 12.

Figure 3:
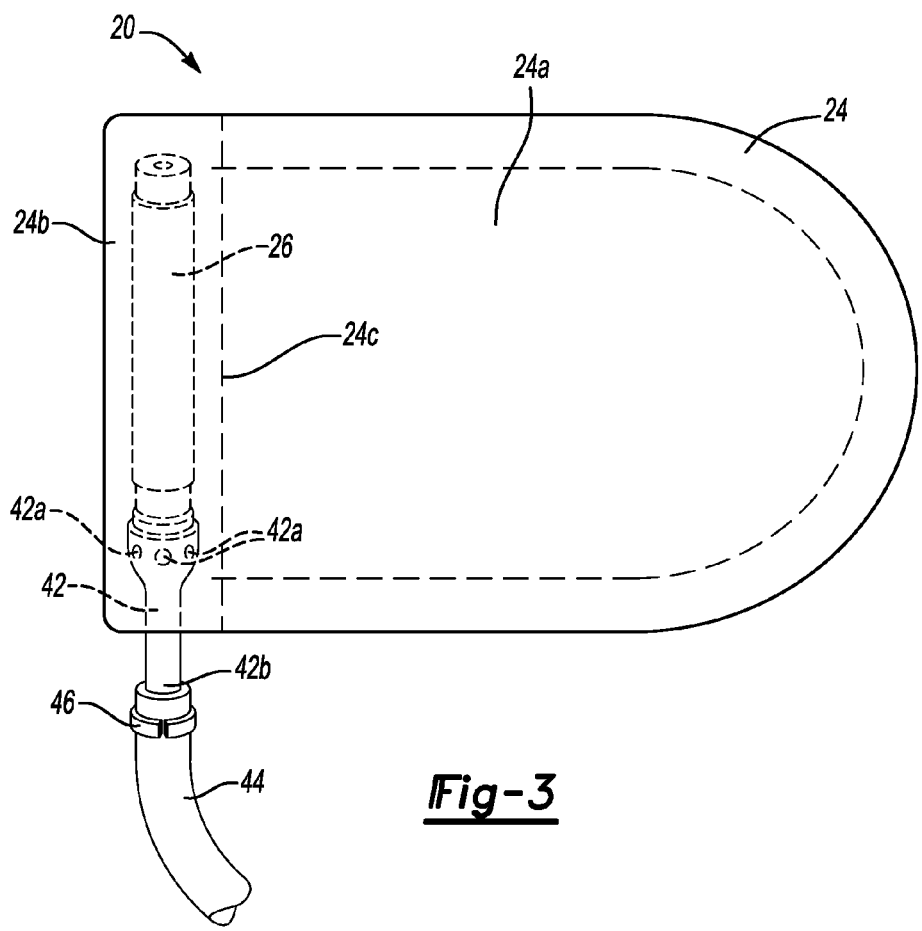
FIG. 3 illustrates an airbag module according to an embodiment of the present invention.

Referring now to FIG. 3, airbag module 20 is shown removed from its operative position within seat back 16 and with side airbag 24 in an unfolded condition. A generally vertical, gas-permeable seam 24c separates side airbag 24 into a main chamber 24a from sleeve portion 24b. Inflator 26 is retained inside of sleeve portion 24b. An outlet tube 42 extends from inflator 26 and exits the sleeve portion 24b at the lower end of side airbag 24. One or more nozzles 42a are formed in outlet tube 42 immediately adjacent inflator 26 and within sleeve portion 24a. Nozzles 42a allow a portion of the gasses released by inflator 26 to escape into side airbag 24, thereby inflating the bag main chamber 24a. An outlet end 42b of the tube extends beyond the lower edge of side airbag 24 and a gas conduit 44 is attached to the outlet end by a clamp 46 or other appropriate fastening means.

As is best seen in FIGS. 1 and 2A, gas conduit 44 is routed downwardly from airbag module 20 within the interior of seat back 16 and emerges at a point adjacent to the lower edge of the seat back. Gas conduit 44 then extends towards seatbelt anchor 28 where it is connected to belt airbag 38. As shown in the illustrated, gas conduit 44 may pass beneath a fastener 50 that secures anchor 28 to floor rail 15 before extending upwardly to meet belt airbag 38. Many alternative routings of gas conduit 44 are possible which will meet the objective of supplying inflation gasses to belt airbag 38.

In the event of a collision, roll-over, or other vehicle incident requiring activation of the side restraint system, airbag module 20 is activated by signals from sensors and/or an electronic restraint control module (not shown) as is well known in the art. The activation signals trigger inflator 26 to release inflation gasses through outlet tube 42. The gasses vent through nozzles 42a to inflate airbag main chamber 24c. As is well known in the airbag art, as airbag 24 inflates, it emerges through a rip-seam or other opening in seat back 16 and assumes an inflated position (not shown) alongside the occupant's shoulder and thorax region.

A portion of the gasses released by inflator 26 pass through outlet tube 42 into gas conduit 44 and into belt airbag 38. The inflation gasses cause belt airbag 38 to expand and emerge from the webbing of lap belt 34 to form an airbag positioned to protect the outer pelvis and thigh region of the seat occupant. The proportion of gasses released by inflator 26 that are routed to fill airbag 24 versus lap belt inflatable portion 34 may be controlled by the design of outlet tube 42, and particularly the relative sizes of the openings of nozzles 42a compared with the size of the opening in outlet end 42b where it connects with gas conduit 44. An electronically or mechanically controlled valve (not shown) may also be used to regulate the volume of gasses and/or timing of inflation of side airbag 24 and belt airbag 38. Operation of such a valve may be controlled by an electronic restraint control module in reaction to the type, severity, location, and/or other qualities of the event triggering activation of the airbag module 20. Gas conduit 44 is flexible along at least a portion of its length to permit seat back 16 to move between the upright seating position shown in FIGS. 1 and 2A and the fold-flat configuration seen in FIG. 2B. Specifically, the portion of gas conduit 44 extending between seat back 16 and seat bottom 14 must flex sufficiently to permit folding of the seat back without impeding the flow of inflation gasses from inflator 26 to belt airbag 38. Gas conduit 44 may comprise any number of separate portions joined to one another to provide end-to-end fluid communication. The relative positions and/or materials composing the separate portions may be selected as necessary to aid manufacturability of the seat and restraint systems and/or to provide the necessary mechanical properties of the conduit along its length. In one possible example, the portion of conduit 44 adjacent anchor 28 may be formed of a rigid material such as plastic or metal to allow it to be fastened to the anchor 28.

In FIGS. 2A and 2B, the portion of gas conduit 44 in the vicinity of the hinge-line between seat bottom 14 and seat back 16 is shown routed externally to the seat components primarily for clarity of the drawings. It may be desirable to route gas conduit 44 in a manner to keep it entirely, or nearly entirely, internal to the seat components for aesthetic reasons and/or to avoid the gas conduit being snagged by objects or otherwise damaged.

Figure 4:
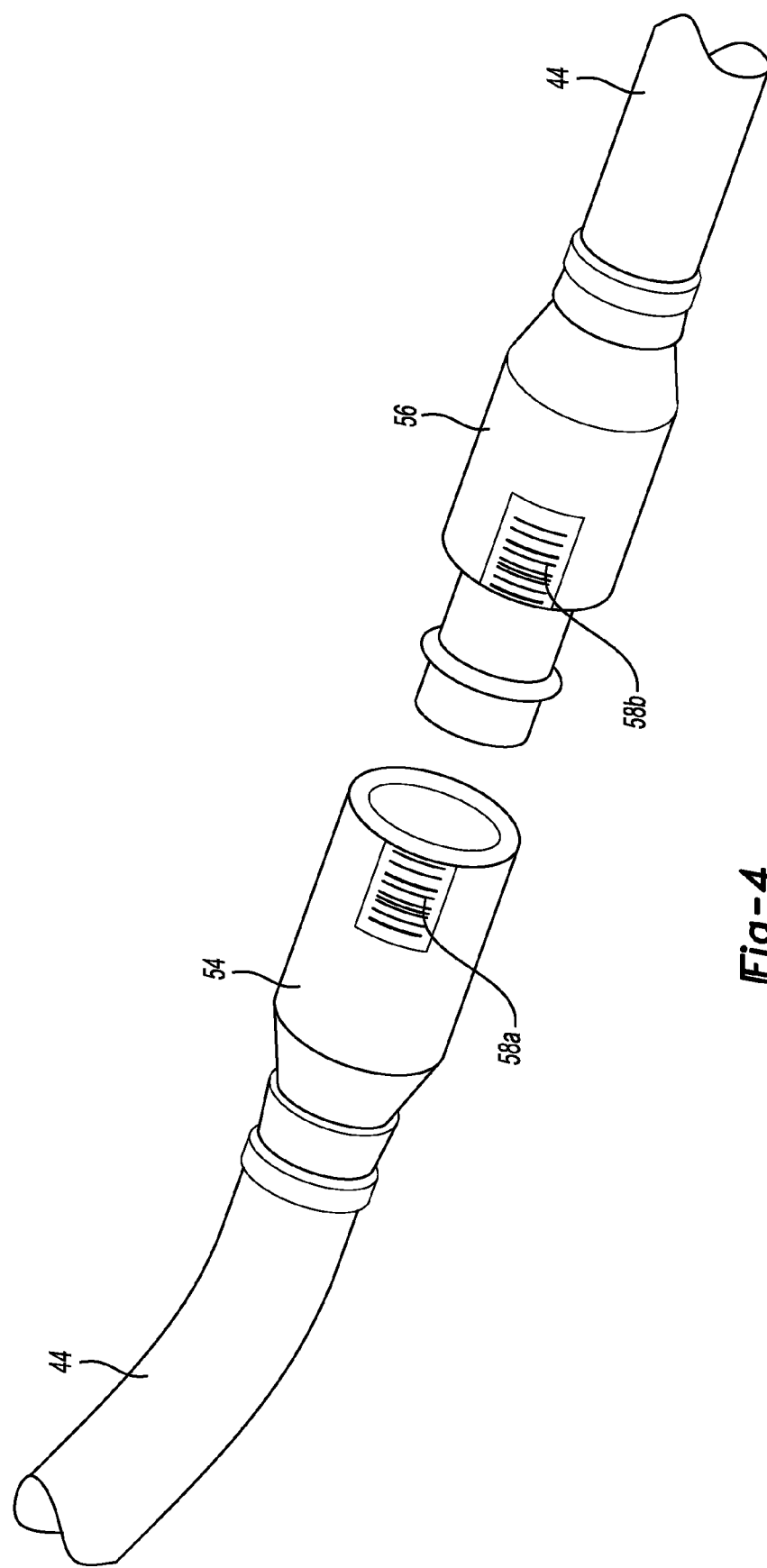
FIG. 4 illustrates a conduit connection according to an embodiment of the invention.

Referring now to FIG. 4, gas conduit 44 may include a first connection fitting 54 and a second connection fitting 56 that are matable with one another to connect a first portion of the gas conduit 44 to a second portion of the gas conduit. First and second connection fittings 54, 56 may comprise a "quick-connect" fitting that may be joined without the use of tools. Connection fittings 54, 56 allow the embodiment of invention to be easily and efficiently assembled in a manufacturing facility. To ensure that a proper connection is accomplished between connection fittings 54, 56, the connection fittings may have first and second portions of an optically scannable code 58a, 58b visible on the respective surfaces. Optically scannable code 58a, 58b may be any of the different types of commercially-used, machine-readable bar code patterns. Examples of such codes are UPC-A, Code 128, Semacode, DataMatrix 2D, Aztec Code, and QR Code.

When the connection fittings 54, 56 are properly mated with one another, the first and second portions of the code 58a, 58b combine to form a complete code that may be read or detected by an optical scanning device (not shown). In this way, a quality control check may be made after assembly of the side-impact protection system, as an optical scanning device will only read the optically scannable code when the fittings are properly connected with one another.

This invention provides a solution for packaging a pelvic-thorax side airbag in a seat that also has a fold-flat mechanism, or some other device mounted in the lower region of seat back frame. The invention involves combining a seat-mounted thorax side airbag with an integrated inflatable seat belt pelvic airbag. Since the thorax side airbag is packaged higher on the seat back frame it will not interfere with the fold-flat mechanism.

The inflatable seat belt is connected to the thorax side airbag by a fill tube so that only one inflator is required. The nozzles in the fill tube and the diameter of the tube can be tuned to adjust the fill rate and pressure of the thorax airbag and inflatable seat belt.

The invention may include a quick-connect feature between the thorax airbag and the inflatable seat belt to provide a means to easily assemble the components. The quick-connect feature includes a bar code split between the two halves of the coupling that can only be scanned by a bar-code reader if the connection is properly mated. This provides a method for monitoring and ensuring proper assembly.

While the best mode for carrying out the invention has been described in detail, those familiar with the art to which this invention relates will recognize various alternative designs and embodiments for practicing the invention as defined by the following claims.

What is claimed:

1. A vehicle seat and integrated side impact protection system comprising:
    a seat comprising a seat bottom and a seat back attached to the seat bottom for movement relative thereto between a seating configuration and a fold-flat configuration, the seat having an outboard side and an inboard side;
    an airbag module disposed within the seat back adjacent the outboard side thereof and comprising a side airbag and an inflator supplying gasses to inflate the side airbag;
    a lap belt extending between the inboard and the outboard sides of the seat and having an inflatable belt airbag adjacent an outboard end of the lap belt disposed adjacent the outboard side of the seat; and
    a gas conduit extending between the airbag module and the lap belt for conducting a portion of the gasses released by the inflator to the belt airbag, the gas conduit having at least one flexible portion to permit movement of the seat back between the seating configuration and the fold-flat configuration.

2. The apparatus according to claim 1 further comprising:
    a seatbelt anchor attached to the outboard end of the lap belt, an outlet end of the gas conduit adjacent the inflatable belt portion being secured to the seatbelt anchor.

3. The apparatus according to claim 2 wherein the seatbelt anchor is attached to a floor rail for securing the seat to a floor of the vehicle.

4. The apparatus according to claim 1 wherein the inflator is disposed inside the side airbag.

5. The apparatus according to claim 4 further comprising an airbag fill tube having an inlet end in fluid communication with the inflator and an outlet end in fluid communication with the gas conduit, the airbag fill tube further having at least one nozzle for discharging the gasses released by the inflator into the airbag.

6. The apparatus according to claim 1 wherein the gas conduit comprises:
    a first connection fitting terminating a first portion of the gas conduit adjacent the airbag module and having a first portion of an optically scanned code imprinted thereon; and
    a second connection fitting terminating a second portion of the gas conduit adjacent the seat belt and having a second portion of an optically scanned code imprinted thereon, the first and second connection fittings mating with one another to achieve fluid communication between the first and second portions of the gas conduit and to place the first and second portions of the optically scanned code in a condition indicating proper connection between the first and second fittings when read by an optical scanning device.

7. A vehicle seat and integrated side impact protection system comprising:
    a seat comprising a seat bottom, a seat back movably attached to the seat bottom, and a folding mechanism disposed within a lower portion of the seat back for enabling movement of the seat back relative to the seat bottom between a seating configuration and a fold-flat configuration, the seat having an outboard side and an inboard side;
    an airbag module disposed within an upper portion of the seat back adjacent the outboard side thereof and comprising a side airbag and an inflator supplying gasses to inflate the side airbag;
    a lap belt extending between the inboard and the outboard sides of the seat and having a belt airbag adjacent an outboard end of the lap belt disposed adjacent the outboard side of the seat; and a gas conduit extending between the airbag module and the lap belt for conducting gasses supplied by the inflator to the belt airbag, the gas conduit having at least one flexible portion to permit movement of the seat back between the seating configuration and the fold-flat configuration.

8. The apparatus according to claim 7 further comprising:
a seatbelt anchor attached to the outboard end of the lap belt, an outlet end of the gas conduit adjacent the inflatable belt portion being secured to the seatbelt anchor.

9. The apparatus according to claim 8 wherein the seatbelt anchor is attached to a floor rail for securing the seat to a floor of the vehicle.

10. The apparatus according to claim 7 wherein the inflator is disposed inside the side airbag.

11. The apparatus according to claim 10 further comprising an airbag fill tube having an inlet end in fluid communication with the inflator and an outlet end in fluid communication with the gas conduit, the airbag fill tube further having at least one nozzle for discharging the gasses released by the inflator into the airbag.

12. The apparatus according to claim 7 wherein the gas conduit comprises:
a first connection fitting terminating a first portion of the gas conduit adjacent the airbag module and having a first portion of an optically scanned code imprinted thereon; and
a second connection fitting terminating a second portion of the gas conduit adjacent the seat belt and having a second portion of an optically scanned code imprinted thereon, the first and second connection fittings mating with one another to achieve fluid communication between the first and second portions of the gas conduit and to place the first and second portions of the optically scanned code in a condition indicating proper connection between the first and second fittings when read by an optical scanning device.

13. A side-impact protection system for use in combination with a vehicle seat comprising a seat bottom and a seat back attached to the seat bottom for movement between a seating configuration and a fold-flat configuration, the system comprising:
an airbag module mountable to the seat back adjacent an outboard side thereof and comprising a side airbag and an inflator supplying gasses to inflate the side airbag;
a lap belt usable in combination with the seat and having a belt airbag adjacent a first end of the lap belt adapted to be secured to the vehicle adjacent an outboard side of the seat; and
a gas conduit conducting a portion of the gasses supplied by the inflator to the belt airbag, the gas conduit having at least one flexible portion to permit folding movement of the seat back between the seating configuration and the fold-flat configuration.

14. The apparatus according to claim 13 further comprising:
a seatbelt anchor attached to the outboard end of the lap belt, an outlet end of the gas conduit adjacent the inflatable belt portion being secured to the seatbelt anchor.

15. The apparatus according to claim 14 wherein the seatbelt anchor is attached to a floor rail for securing the seat to a floor of the vehicle.

16. The apparatus according to claim 13 wherein the inflator is disposed inside the side airbag.

17. The apparatus according to claim 16 further comprising an airbag fill tube having an inlet end in fluid communication with the inflator and an outlet end in fluid communication with the gas conduit, the airbag fill tube further having at least one nozzle for discharging the gasses released by the inflator into the airbag.

18. The apparatus according to claim 13 wherein the gas conduit comprises:
a first connection fitting terminating a first portion of the gas conduit adjacent the airbag module and having a first portion of an optically scanned code imprinted thereon; and
a second connection fitting terminating a second portion of the gas conduit adjacent the seat belt and having a second portion of an optically scanned code imprinted thereon, the first and second connection fittings mating with one another to achieve fluid communication between the first and second portions of the gas conduit and to place the first and second portions of the optically scanned code in a condition indicating proper connection between the first and second fittings when read by an optical scanning device.

* * * * *